(12) United States Patent
Misra

(10) Patent No.: US 7,162,250 B2
(45) Date of Patent: Jan. 9, 2007

(54) METHOD AND APPARATUS FOR LOAD SHARING IN WIRELESS ACCESS NETWORKS BASED ON DYNAMIC TRANSMISSION POWER ADJUSTMENT OF ACCESS POINTS

(75) Inventor: Archan Misra, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 10/439,875

(22) Filed: May 16, 2003

(65) Prior Publication Data

US 2004/0229621 A1  Nov. 18, 2004

(51) Int. Cl.
*H04Q 7/20* (2006.01)
(52) U.S. Cl. .................. 455/453; 455/452.1; 455/522; 455/445
(58) Field of Classification Search ................ 455/453, 455/452.1, 452.2, 450, 455, 509, 513, 514, 455/516, 446–448, 127.1, 522, 517, 63.4, 455/456.1, 436, 438, 443, 444, 405
See application file for complete search history.

(56) References Cited

U.S. PATENT DOCUMENTS

| | | | | |
|---|---|---|---|---|
| 6,104,936 A | * | 8/2000 | Kronestedt | ................ 455/562.1 |
| 6,438,376 B1 | * | 8/2002 | Elliott et al. | ................ 455/437 |
| 6,522,888 B1 | * | 2/2003 | Garceran et al. | ............ 455/439 |

FOREIGN PATENT DOCUMENTS

| GB | 2 311 191 A | 9/1997 |
|---|---|---|
| WO | WO 97/08909 | 3/1997 |
| WO | WO 03/036815 A1 | 5/2003 |

OTHER PUBLICATIONS

Watanabe, et al., "Overlapping Coverage Control in Sector Cells", IEICE Transactions on Communications, Institute of Electronics Information and Comm. Eng., Tokyo, Japan, vol. E79-B, No. 3, Mar. 1, 1996, pp. 368-372.
"Spotlight 2230 Integrated Smart Antenna for Flexenttm Modular Cell Base Stations", 2002, Metawave Communications Corporation.

* cited by examiner

*Primary Examiner*—Jean Gelin
(74) *Attorney, Agent, or Firm*—Scully, Scott, Murphy & Presser, P.C.; Marian Underweiser, Esq

(57) ABSTRACT

A load balancing system and methodology for packet-based wireless cellular networks, whereby wireless access points are dynamically reconfigured by altering their transmission power level to modify their area of coverage. The modification function is based on the localized traffic load or congestion at each individual access point, or the collective load experienced by groups of access points. This modification to the cellular layout is used as an implicit load-balancing technique. When an overloaded access point reduces its coverage area, it forces some wireless client devices that were earlier within its footprint, but no longer within its coverage area, to attach to alternative access points. Similarly, when an underloaded access point increases its coverage area, it provides an opportunity to wireless devices, which were earlier outside its footprint, but now within the expanded coverage area, to switch attachment to this access point. By changing the access point to which a wireless device attaches, the load-levels on the individual access points are indirectly changed.

24 Claims, 6 Drawing Sheets

METHOD AND APPARATUS FOR LOAD SHARING IN WIRELESS ACCESS NETWORKS BASED ON DYNAMIC TRANSMISSION POWER ADJUSTMENT OF ACCESS POINTS

BACKGROUND OF THE INVENTION

1. Field of the Invention

The present invention relates to computer network connectivity and wireless networking, and particularly, to a cellular wireless access infrastructure, where individual client wireless devices use a set of access point devices as gateway nodes to connect to a wired backbone network.

2. Description of the Prior Art

Wireless access networks are often designed in a cellular fashion, with multiple access points (also called base stations) offering multiple points of attachment to a backbone (e.g., wired) networking infrastructure. Individual wireless client computing devices may connect to the network by attaching to one (or, at least in theory, more) of these access points, as long as they lie within a communication range of the concerned access point(s). The access points (APs) are laid out in cellular fashion, with each access point's area of coverage being defined by an area known as the cell size. The composite architecture thus consists of multiple cells. Since cells can overlap with one another, a wireless client device located inside the region of overlap may have multiple candidate APs, and hence, may be associated with more than one access point. On the other hand, if the cells are non-overlapping, a wireless device has only one candidate access point. Thus, it stands that the set of candidate access points for a wireless devices is a function of, and can be altered merely by changing, the coverage areas of the individual APs.

The coverage area of a cell is principally dependent on the transmission power employed by the AP—as it is a well accepted principle of wireless communications that the larger the transmission power, the greater the communication range and hence, the larger the coverage area, also called the footprint, of the associated cell. Communication disruption and collisions between neighboring cells are avoided through a variety of techniques, including frequency partitioning (such that neighboring cells communicate on non-overlapping frequency bands), code partitioning (such that neighboring cells use orthogonal codes to avoid mutual interference) or time partitioning (such that neighboring cells communicate at non-overlapping time intervals).

Now, each cell (or equivalently, the AP) has a predefined traffic capacity, defined in terms of various parameters such as the available bandwidth or number of channels. If a larger number of wireless devices happen to attach to a single AP, or if some of the attached wireless devices generate excessively large quantities of traffic, that access point can experience congestive overload, leading to either service denial or service degradation. Since the physical movement pattern of wireless devices, or the density of such devices in various physical regions, cannot be predicted in advance, the access points should have a mechanism for dealing with sudden increases or decreases in load. This family of mechanisms is called load-balancing, and can typically take one of two approaches:

Capacity Adaptation: An overloaded access point can try to increase its own capacity by borrowing capacity from neighboring APs.

Load Adaptation: An overloaded access point can try to reduce its own load by forcing or directing some or all of its associated wireless devices to switch to an alternative neighboring AP.

Most current load-balancing in cellular networks use the Capacity Adaptation solution: an overloaded access point borrows excess capacity from neighboring underutilized APs. Examples of such adaptive capacity adjustment solutions can be found in the works of: S. Tekinay and B. Jabbari entitled "Handover and Channel Assignment in Mobile Cellular Networks" IEEE Communication Magazine, November 1991; S. Das, S Sen and R. Jayaram entitled "Dynamic load Balancing Strategy for Channel Assignment using Selective Borrowing in Cellular Mobile Environments", Wireless Networks(3), 1997; and, D. Cox and D. Reudnick. "Increasing Channel Occupancy in Large Scale Mobile Radio Systems: Dynamic Channel Assignment", IEEE Trans. On Vehicular Techology, 1973. In such mechanisms, each access point is able to simultaneously communicate on multiple channels. When overloaded, an access point borrows idle communication channels (essentially additional capacity) from neighboring cells. The coverage area of each access point, however, remains unchanged. Such schemes work only when an individual AP has expensive hardware and specialized software to support multiple simultaneous channels. Many AP implementations (e.g., those for IEEE 802.11-based Wireless LANs) can support only one channel—the capacity of each AP is then fixed. Implementations however do have flexibility in setting the transmission power level. In such environments, channel-borrowing schemes cannot work: load-balancing is, however, possible using the implicit approach of power control.

Other published work, for example, as found in the works of S. V. Hanly. "An Algorithm for Combined Cell-Site Selection and Power Control to Maximize Cellular Spread Spectrum Capacity", IEEE Journal of Selected Areas in Communication, September 1995, and, J. Qiu and J. Mark. "A Dynamic Load Sharing Algorithm through Power Control in Cellular CDMA", have discussed the use of power control by an AP while communicating with its set of attached wireless devices. The focus of the systems described in these references is to reduce the communication power between an AP and a set of already attached wireless devices to the minimum level necessary to sustain communication. Such reduction not only conserves energy, but also serves to reduce interference to neighboring cells. It is true that, during such communication, the reduction in power implies a corresponding reduction in the communication range of the access point.

It is understood that, in these prior art schemes, reduction is performed only during the communication with an attached wireless device. That is, power control is never performed to control the set of devices that can legitimately attach to this access point.

Wireless devices typically determine the set of possible APs by using intermittent beacon signals. Approaches such as described in above-referenced references to S. Tekinay and B. Jabbari entitled "Handover and Channel Assignment in Mobile Cellular Networks" IEEE Communication Magazine, November 1991 and S. Das, S Sen and R. Jayaram entitled "Dynamic load Balancing Strategy for Channel Assignment using Selective Borrowing in Cellular Mobile Environments", Wireless Networks(3), 1997, have no notion of increasing or decreasing the power levels of these beacon signals; instead, they adjust power levels only on a per-packet basis, after a node has attached to an access point.

Accordingly, systems such as described in these prior art references do not solve the traffic load balancing problem.

Thus, there exists a need for a novel traffic load-balancing solution for AP's in cellular and wireless communications networks.

To date, no prior work discusses the notion of gratuitously and dynamically increasing the power level of an access point to increase the set of wireless devices that can attach to it. That is, AP transmission power is simply not treated as a parameter of the load-balancing solution.

It would thus be highly desirable to provide a load-balancing approach that implements the concept of proactive increase or decrease of the transmission power by an AP.

SUMMARY OF THE INVENTION

A principle aspect of this invention is the implementation of dynamic changes to the transmission power levels used by individual APs, as an indirect and implicit technique to perform load balancing in packet-based wireless cellular networks. As the power level of an AP increases, so does its coverage area, implying that wireless communications devices that were outside its range of communication may now lie within the expanded cell area.

Further to this aspect of the invention, there is provided a load balancing system and methodology for packet-based wireless cellular networks. In essence, according to the invention, the wireless access points may be dynamically reconfigured (e.g., by altering their transmission power level) to modify their area of coverage (also known as cell footprint). The modification function may be based on the localized traffic load or congestion at each individual access point, or the collective load experienced by groups of access points. This modification to the cellular layout is used as an implicit load-balancing technique. When an overloaded access point reduces its coverage area, it forces some wireless client devices that were earlier within its footprint, but no longer within its coverage area, to attach to alternative access points. Similarly, when an underloaded access point increases its coverage area, it provides an opportunity to wireless devices, which were earlier outside its footprint, but now within the expanded coverage area, to switch their attachment to this access point. By changing the access point to which a wireless device attaches, the load-levels on the individual access points can be indirectly changed. Advantageously, the changing may be effected without the requirement of additional signaling or messages being defined between the access point and individual wireless devices; the default standard behavior of wireless client devices is enough to ensure the requisite changes in their point of attachment.

When a particular cell (or equivalently, AP) gets overloaded, the invention proposes to increase (in a controlled manner) the power level of neighboring access points, such that they increase the area of overlap with the specific cell. As a result of this overlap, a larger number of computing devices find it feasible to access the wired network via alternative APs, thereby shifting a fraction of the load from the current access point to neighboring APs. Alternatively, when a particular cell gets overloaded, the invention proposes a technique by which the associated AP lowers its transmission power, thereby decreasing the footprint of its associated cell. Accordingly, nodes that lie outside the decreased coverage area (but were within the bounds of the original cell footprint) will now be forced to associate with alternative APs, thereby offloading a fraction of the traffic load from the (currently) overloaded access point to suitable alternative APs. Advantageously, the power-adaptation techniques implemented requires no special antenna capabilities, and works in relatively unsophisticated and inexpensive wireless network installations.

Key to the invention is the dynamic variation of the cellular network layout (topology) itself through dynamic variation of the power levels, and utilizing this dynamic change in topology as a response mechanism for load-balancing under variable traffic loads. As a consequence of the dynamic variation of the cellular network layout (topology) itself through dynamic variation of the power levels, the wireless devices themselves benefit because such network-initiated load-balancing does not require any additional signaling messages between wireless devices and APs. In fact, the power-control technique may be used, both without and in coordination with, additional signaling messages between wireless client devices and APs. The primary advantage of the power-adjustment method is that it requires no additional signaling messages (other than those mandated by the default behavior of the wireless devices) to affect load balancing. Once the coverage areas of different APs are modified, the wireless devices will eventually reattach to alternative APs.

That is, in an exemplary embodiment, when new wireless devices power up and attempt to connect to the wireless network, they will see the modified set of coverage areas, and attach to their preferred AP on the basis of this modified set of coverage areas. The attempts by the network to balance the traffic load are completely transparent to the wireless devices.

According to another aspect of the invention, there is provided a centralized entity referred to as a Load Balancing Manager (LBM) that may be implemented in software to adjust the power levels (and hence, footprints) of a collection of APs. By monitoring the load levels on each of the individual APs, the LBM detects when a particular access point is loaded (which may be expressed as a variety of conditions, such as the number of attached users exceeding a threshold, or the volume of traffic exceeding a certain rate, or the processing delay exceeding an acceptable bound). The LBM then instructs neighboring underloaded APs to increase their transmission power level, thereby increasing their area of overlap with the current AP's footprint. As a result of this overlap, one or more wireless devices attached to the current AP may now lie in the footprint of alternative APs; by switching these devices to those APs, the LBM may reduce the traffic load on the current AP to more acceptable levels.

An alternative aspect of this invention is that it additionally allows for the independent power adjustment by individual APs, with only minimal coordination with neighboring APs, and without any centralized coordination. An access point that is experiencing significant overload may simply decide to decrease its cell size, and request its neighbors to increase their coverage area to pick up the resulting slack. Each AP may do this in a completely asynchronous and un-synchronized manner, with only a limited amount of localized signaling (with neighboring APs), using the wired network.

Yet another aspect of the load balancing technique of the invention is that the process of adjusting the transmission power level (coordinated or independent) may be initiated by either the APs, or by the wireless computing devices. The invention utilizes both wireless device initiated triggers (such as indications of poor service or high delays) or, AP-initiated triggers (such as excessive number of users or excessive traffic rates) as the start of the power-adjustment process. Moreover, the load-balancing technique may either use specific explicit signaling messages to instruct a wireless device to re-associate with a specific alternative (or any alternative) AP, or may leave it to future independent events (such as link failures or wireless device movement) to initiate the reattachment process to an alternative AP.

Yet a further aspect of the invention relates to the combining of the power adjustment technique at the AP with additional power adjustment techniques at one or more wireless devices. Under this approach, an overloaded AP may also shed some of its load by simply asking some of its attached wireless client devices to increase their transmission range, and consequently connect to alternative neighboring APs. To ensure successful bi-directional communication, this approach may also require one or more neighboring APs to increase their transmission power.

A final aspect of this invention relates to the method by which the LBM, or an individual AP, may decide on the degree by which the power level of an overloaded AP needs to be increased, or the power level of an underloaded AP needs to be decreased. In essence, every value of the transmission power level is associated with a well-defined transmission or communication range. Moreover, in one embodiment, the location of the individual APs is assumed to be known to the system. Accordingly, the LBM or an individual AP may then determine the distance between neighboring APs. To ensure that no "blind spots" occur due to non-overlapping coverage areas of neighboring APs, the system ensures that when the power level of an AP is reduced, the power level of a neighboring AP is increased to at least the level needed to ensure that the sum of the transmission ranges of the two APs equals or exceeds the physical distance between them. Moreover, the invention also encompasses an approach of gradual increase or decrease, where the power level of an overloaded AP is increased gradually, and the power level of an underloaded AP is decreased gradually, until the loads are satisfactorily redistributed. Of course, alternative embodiments of this invention could use different algorithms for increasing or decreasing the transmission power (e.g., make the amount of transmission power decrease on an overloaded server proportional to the amount of overload on the server), where the increase or decrease occurs in larger amounts.

BRIEF DESCRIPTION OF THE DRAWINGS

Further features, aspects and advantages of the apparatus and methods of the present invention will become better understood with regard to the following description, appended claims, and the accompanying drawings where:

DETAILED DESCRIPTION OF THE PREFERRED EMBODIMENT

Figure 1:
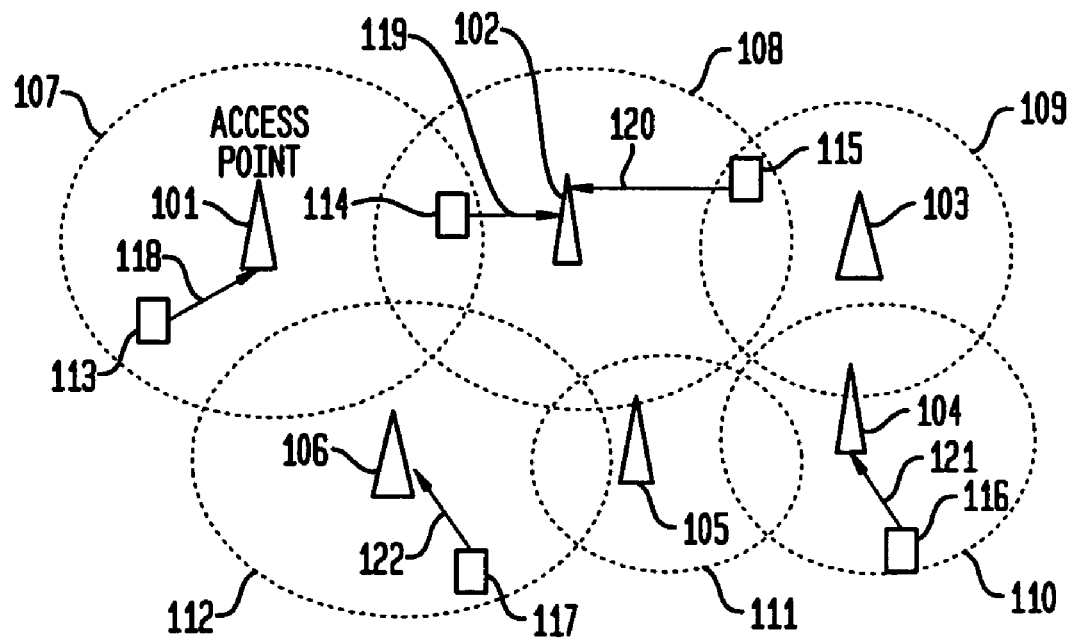
FIG. 1 depicts the general layout of a cellular access network, illustratively explaining the role of APs, and showing how various wireless devices attach to and communicate with specific APs.

The invention is directed to a new load balancing mechanism that is a member of the Load Adaptation approach. While prior art mechanisms for Load Adaptation rely on explicit signaling (exchange of messages) between the AP and a wireless client node, in effect, instructing it to switch to an alternative AP, even though the wireless node is still within the footprint of the current AP, the load-balancing mechanism according to one embodiment of the present invention, as will be hereinafter described, does not require any such explicit signaling, but instead, forces a target wireless device to switch to another AP, by reducing the footprint of the AP to exclude the wireless device from the new footprint.

That is, the present invention provides a way in which a set of access points providing wireless cellular coverage use adjustments to their transmission powers to alter the cellular topology in response to excessive traffic loads at certain "hot-spots". For example, an overloaded access point is enabled to reduce its coverage area (cell size) by simply reducing its transmission power. As a result of this reduction in coverage area, some wireless client devices that were earlier using this access point would re-associate themselves with alternative access points, thereby reducing the traffic load on this access point. In a similar manner, this invention enables an underloaded or underutilized access point to increase its coverage area, thereby offering some wireless client devices that were previously outside its coverage area the opportunity to associate themselves with this access point.

The invention is additionally directed to a method and apparatus by which this power adjustment process could lead to traffic balancing in the wireless access network, without requiring any new signaling or protocols to be deployed in the wireless client devices. The access network can then provide load balancing, even when the individual access points do not possess the capability to dynamically alter their capacity by techniques such as borrowing channels or bandwidth from neighboring access points. Further, a control system including a centralized software entity, referred to herein as a Load Balancing Manager, is provided to coordinate the process by which individual access points (APs) increase or decrease their transmission range. Such central coordination ensures that when an overloaded access point reduces its coverage area, its neighboring APs increase their own coverage areas, thereby ensuring that the coverage suffers from no "blind spots" (outside the coverage areas of all access points) and that all wireless client devices may continue to access the wired networking infrastructure. In alternative embodiments, the load-balancing process may be performed autonomously by each access point, which simply decides to increase or decrease its coverage area based on measurements of its own load levels. As yet another alternative embodiment, the load-balancing technique could be performed, without a central coordinator, by having groups of neighboring APs communicate among themselves to determine the appropriate adjustment of their transmission ranges.

FIG. 1 illustrates the typical layout of a wireless cellular access network comprising a group of access points (often also called base stations) (e.g., 101, 102, 103, 104, 105, 106). Each base station has a transmission power, which determines its area of coverage. These coverage areas are shown by dotted circles (e.g., 107, 108, 109, 110, 111, 112) in FIG. 1. For any particular access point, the entire region within the corresponding dotted circle corresponds to its coverage area, such that the access point is a feasible candidate for attachment for any wireless device located within that coverage area. Individual wireless access devices (e.g., 113, 114, 115, 116, 117) typically move within this coverage area and attach to one of the access points. In general, a particular wireless device can lie in an area of overlapping coverage between multiple access points (for example, wireless device 115 lies within the coverage area of both 102 and 103), and can thus choose from multiple alternative APs.

Figure 2:
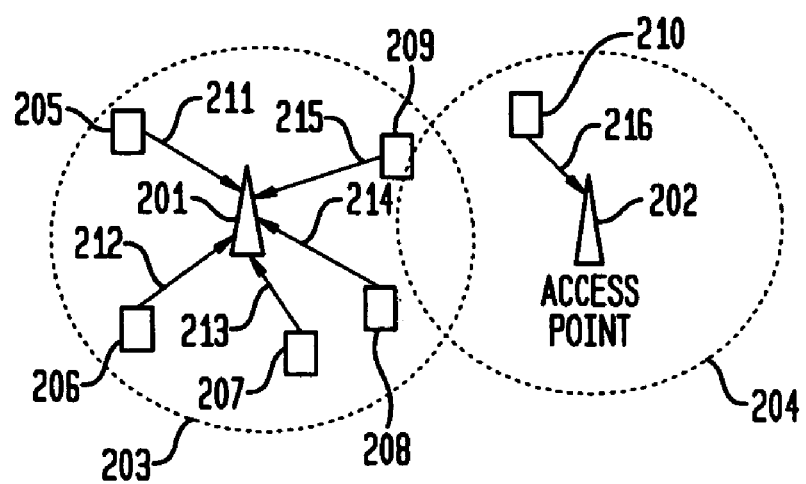
FIG. 2 depicts an example overload situation occurring at an access point in a cellular environment.

When a large number of wireless client devices attach to a single access point, or when devices attached to an access point generate unacceptably high amounts of traffic, the corresponding access point may get overloaded and suffer from poor performance. FIG. 2 depicts an overload situation occurring at an access point in a cellular environment. In general, overload occurs when many wireless client devices move into the coverage area of a particular access point and attach to it, increasing the traffic load associated with that access point. On the other hand, at the same time, a neighboring access point may be underloaded if it is not serving too many wireless client devices. Thus, FIG. 2 illustrates an example situation where access point A (201) with area of coverage (203) has 5 wireless devices W1 (205), W2 (206), W3 (207), W4 (208) and W5 (209) that attach to it (shown by the lines 211, 212, 213, 214 and 215 respectively), while access point B (202), with similar area of coverage (204) has only one device W6 (210) attached to it (shown by line 216). Clearly, by switching some of the wireless client devices (e.g., W4 (208) and W5 (209)) to access point B (202), the system would alleviate overload on access point A (201), without causing an unacceptable increase in the overhead of access point B.

Figure 3:
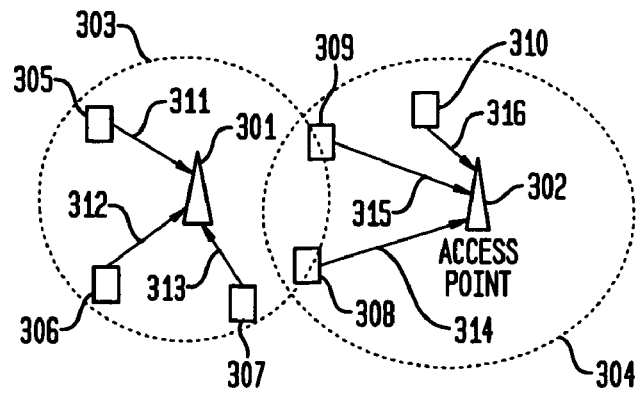
FIG. 3 depicts a solution according to the invention for adjusting the AP coverage areas to perform load balancing and alleviate the traffic imbalance.

FIG. 3 depicts how this overloaded situation of FIG. 2 is rectified through an appropriate modification of the transmission powers (coverage areas) of the access points. By expanding its coverage area, an access point may effectively draw away some client devices from another access point, thereby helping to transfer some traffic from the neighboring overloaded access point. Thus, in FIG. 3, access point B (302) has increased its coverage area (from the corresponding value in FIG. 2), while access point A (301) has decreased its coverage area. The wireless client devices W1 (305), W2 (306) and W3 (307) continue to maintain their association (311, 312 and 313 respectively) with access point A (301), while the wireless client device W6 (310) continues to maintain its association (316) with access point B (302). However, in contrast with FIG. 2, wireless client devices W4 (308) and W5 (309) have switched their association (314 and 315 respectively) to access point B, thereby relieving the congestion on access point A. In the preferred embodiment of the invention, the switching of devices W4 and W5 to access point B is achieved merely through the modification of the transmission powers of APs A and B, with no additional signaling needed from or to the client devices. It is understood that, according to different embodiments of the invention, different algorithms may be employed for computing the extent (quantity) by which the transmission powers of APs are increased or decreased. For example, there exists a well-known one-to-one correspondence between any transmission power level and the associated transmission range. Accordingly, any possible combination of power decrease at an overloaded AP, and increase at an underloaded neighboring AP, is feasible, as long as the sum of their transmission ranges exceeds or equals the physical distance between them.

Figure 4:
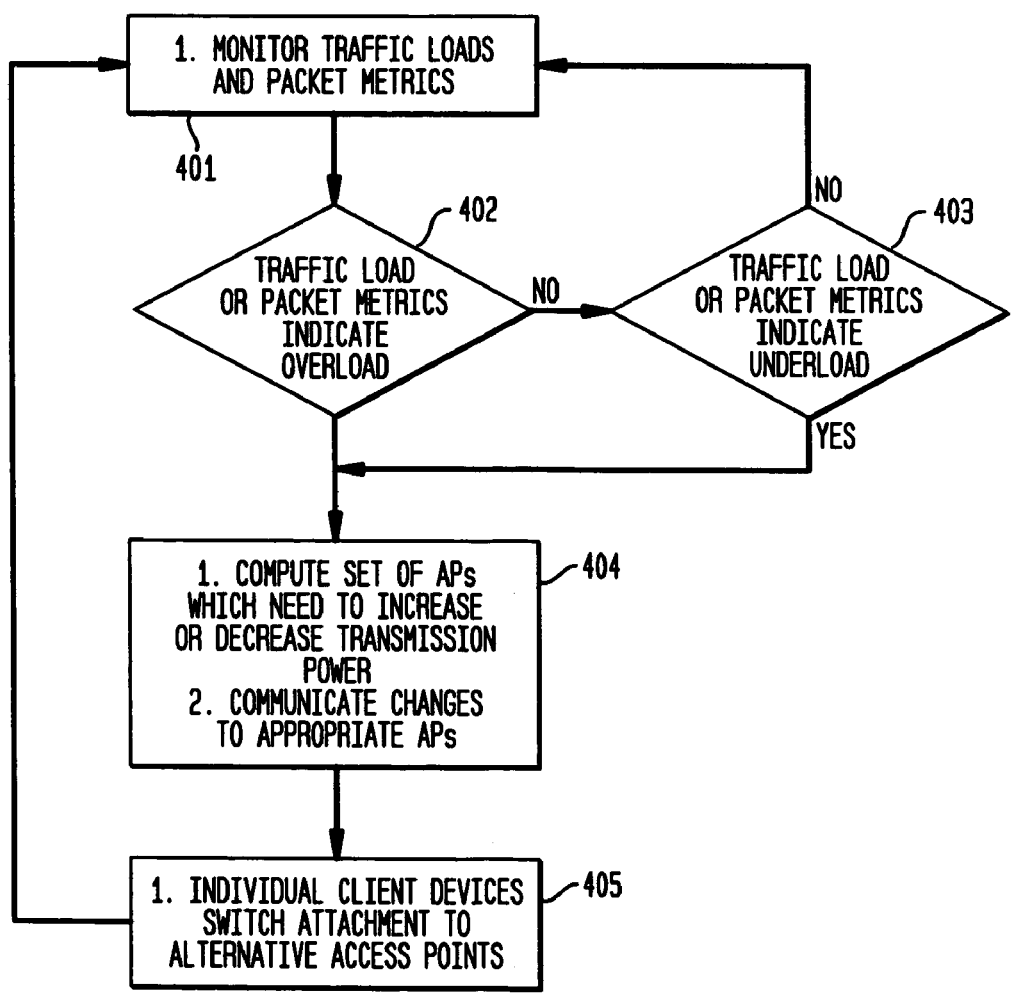
FIG. 4 is a flow chart depicting the basic sequence of steps performed in the load-balancing solution according to the invention.

FIG. 4 is a flow chart illustrating the functional steps that are implemented to perform transmission power-based load balancing. Basically, the method comprises steps of detecting an overloaded or underloaded AP, then computing the necessary changes to the power levels of an AP and instantiating those changes, and finally having one or more client devices switch their attachment to another neighboring AP. As a result of this switch, the load on an overloaded AP decreases, and the load on an underloaded AP should increase.

As shown in FIG. 4, the first step (401) involves the continuous monitoring of traffic load conditions and/or packet metrics and at (402), the detection of overload at one or more APs, or the detection of underloaded conditions (403) at one or more APs. Each of these conditions is used to invoke the adjustment of transmission powers (coverage areas) at one or more APs (404). Candidate embodiments for an algorithm to adjust the individual transmission powers at an AP include (among a variety of other alternatives that anyone reasonably skilled in this art will be able to construct): a) always decreasing the transmission power of an overloaded AP to the next lower power level, followed by appropriate increases to neighboring APs to ensure appropriate overlap of coverage areas; and, b) decreasing the transmission power of an overloaded AP based on the magnitude of its current load, or on the individual or collective location of the wireless client devices that are currently attached to it. In essence, if the overload is higher, decrease the transmission power by a larger amount Similarly, if most of the wireless client devices are closer to the AP, rather than farther away, decrease the transmission power by a larger amount.

As a final step of load balancing, one or more client devices then switch their attachment (405) to a new AP, thereby changing the distribution and load of traffic on individual APs. Thereafter, the monitoring process continues by returning to step (401). The detection of overload at one or more APs may be performed via a variety of standard approaches. This detection may also be performed at either one or more APs, or at one or more wireless client devices. For example, a simple form of detection may involve each access point tracking the number of attached users, or the number of bits/sec that pass through it, and flagging an overloaded condition if these values exceed some preconfigured bounds. Similarly, a wireless client device may indicate overload or congestion by monitoring various performance metrics associated with its packets (e.g., the packet delay, or the packet loss rate) and flagging overload if these exceed a specific bound. Similarly, access points can also detect when they are underutilized, and hence are in a position to expand their coverage area and allow additional wireless devices to attach to them.

The actual computation of new coverage areas and transmission powers may be performed in a centralized computing server operating under software control and referred to as a Load Balancing Manager, or, may be distributed across the many individual APs. As one possibility, the increase or decrease of transmission powers may take place in a set of discrete steps. For example, an overloaded access point may decrease its transmission power from the current level to the next lower value in its finite set of permissible power levels, and after a predetermined period of time, decide if this reduction has been adequate in ensuring load distribution. Thus, if the AP needs to reduce its power level further, it may do so iteratively. Finally, the switching of client devices to alternative APs may itself occur in a variety of ways. It may be forced to switch by issuing special signaling messages to them from their current AP, or may occur as a forced switch if they happen to fall outside the reduced range of their current AP, or may occur as a result of intermittent client-initiated checks to see if alternative APs exist that can provide better performance or coverage. In one embodiment of this function, the client device may compare the received signal strengths of beacons issued by individual APs, and may switch to the one that has the largest signal strength.

According to the invention, a centralized Load Balancing Manager (LBM) may be located to coordinate the adjustment of transmission powers across a set of APs belonging to a common access domain and under the control of a common administrative entity. Details regarding the operation of the Load Balancing Manager are discussed in greater detail herein with respect to FIGS. 5 and 8.

Figure 5:
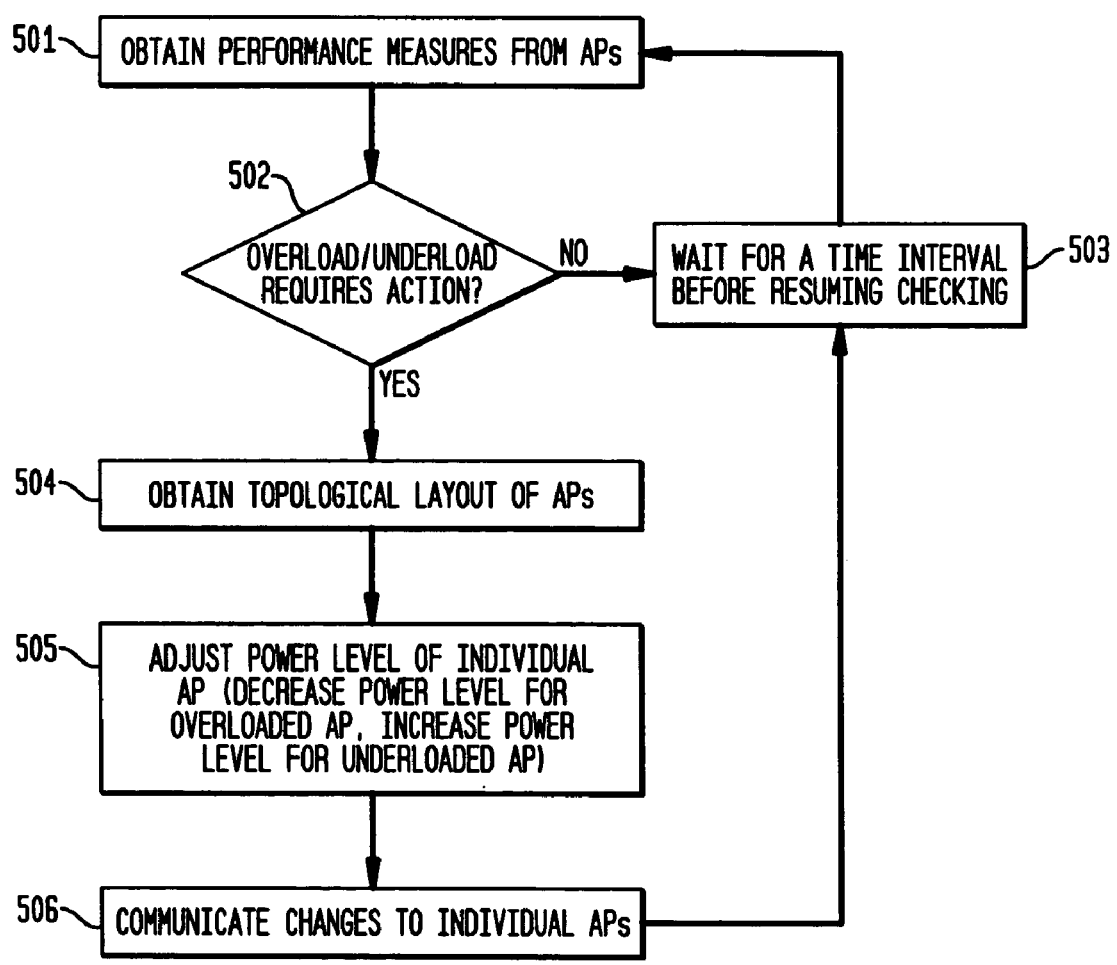
FIG. 5 is a flow chart depicting the basic sequence of steps performed by a centralized software entity called the Load Balancing Manager that acts as a central point of control for the power adjustment process according to one embodiment of this invention.

FIG. 5 illustrates the methodology performed by the LBM as part of the load-balancing function. The LBM must determine (501) the appropriate load levels on the various APs, and compare them (502) against policy-dependent thresholds to decide if any power adjustment needs to be performed to remedy a situation of unacceptably high overload or underload. These load levels are typically computed by well-known techniques using measurements of various well-known performance metrics, such as packet transmission delays, packet loss rates, packet transmission delay variation (jitter), AP processor utilization, AP memory utilization, number of attached wireless devices, etc. among others. For the purposes of illustration, a set of such metrics is outlined in a reference to V. Paxson, G. Almes, J. Mahdavi, M. Mat this entitled "Framework for IP Performance Metrics", IETF, RFC 2330, May 1998, available at: http://www.ietf.org/rfc/rfc2330.txt) and incorporated by reference as if fully set forth herein. If the current conditions are fine, the LBM essentially skips any adjustment for now, and waits for a period of time (503) before checking the conditions of the access network again. If the current traffic conditions indicate the need to modify the power levels at various APs, the LBM must first retrieve (504) the topographical layout of the APs, to determine the set of neighbors for any particular AP. This neighborhood information may be available in the means of a simple connectivity graph (with an edge between any two neighboring APs), or in the form of precise geographical location of each AP, or any other form of location representation. Based on this location information, and the load levels, the LBM computes (505) the set of APs where the power may be adjusted. This computation may itself be of various kinds. In the simplest computation, the LBM instructs an overloaded AP to reduce its transmission power, without specifying an explicit value for the amount of reduction. In more complicated algorithms, the LBM computes the precise adjustments needed to each AP's power, taking care to ensure that the adjustment of coverage areas does not result in any "blind spots". Finally, the LBM must instruct (506) the individual access points to perform the appropriate power-level adjustments, before looping again after a specified time interval.

Figure 6:
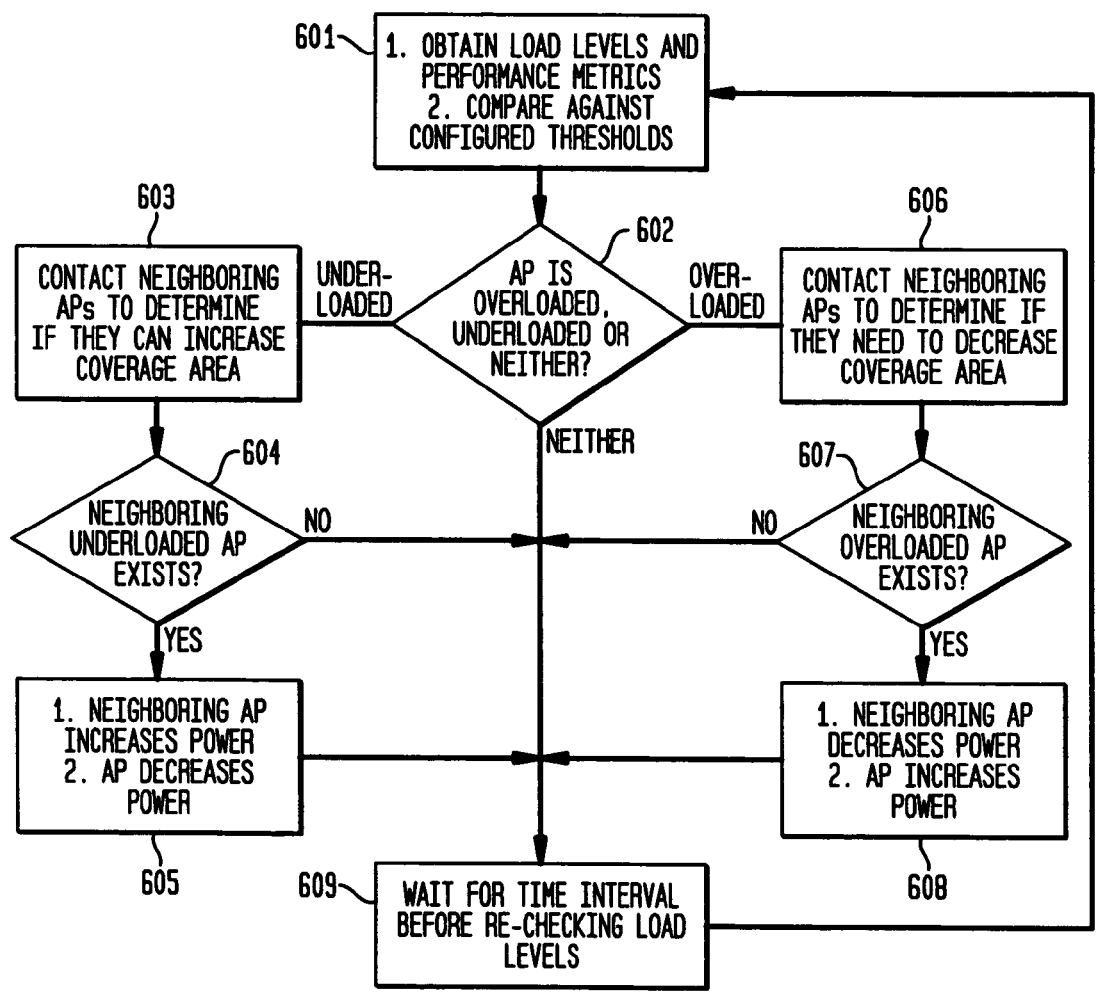
FIG. 6 depicts an alternative embodiment of power-based load balancing, where each AP operates autonomously and power control is performed in a distributed fashion.

In another embodiment of this invention, the adjustment of transmission powers is performed by the APs themselves, without the presence of a centralized controlling entity. A typical set of steps in the decentralized embodiment of this invention is shown in FIG. 6 which depicts an alternative embodiment of power-based load balancing, where each AP operates autonomously and power control is performed in a distributed fashion. In this approach, each AP essentially queries its neighboring APs to determine if it can and should change its power level. This approach uses localized load-balancing, with the transfer of wireless client devices from an overloaded AP to one of its underloaded neighboring APs. Thus, as shown in FIG. 6, each access point must first determine if it is a position to either increase or decrease its transmission power (and thus, its coverage area). To determine this, each AP first obtains (601) its current performance metrics, such as the number of attached users or traffic rates, and compares it against some thresholds. As a result of this computation, the AP is able to decide (602) if it is currently in an overloaded state (and hence, needs to reduce its power level), or an underloaded state (and hence, can increase its power level if required to by some neighboring AP) or in an operating range where it should continue to maintain its current transmission power level. If the AP is in an underloaded state, it then queries (603) its neighboring APs to see if any of them is overloaded and would like to transfer some load to it. After obtaining this information, the access point determines (604) if it should increase its area of coverage. If this underloaded access point has an overloaded neighboring AP, then the embodiment works by having (605) the underloaded AP increase, and one or more of the overloaded neighboring APs reduce, its transmission power. After completing this process, the AP waits for a specified interval (609) before iterating back to step (601). If the AP was in a state where it should maintain its current power level, then it simply waits for a specified interval before looping back to step (601). If, however, the access point is in an overloaded state, it queries (606) its neighboring APs to see if any of them are in an underloaded state and can increase their coverage area. If such underloaded neighbors are found (607), the embodiment then requires (608) the overloaded AP to decrease, and one or more of its underloaded neighboring APs increase, their transmission power prior to waiting at step (609) and initiating the process again at step (601).

Figure 7:
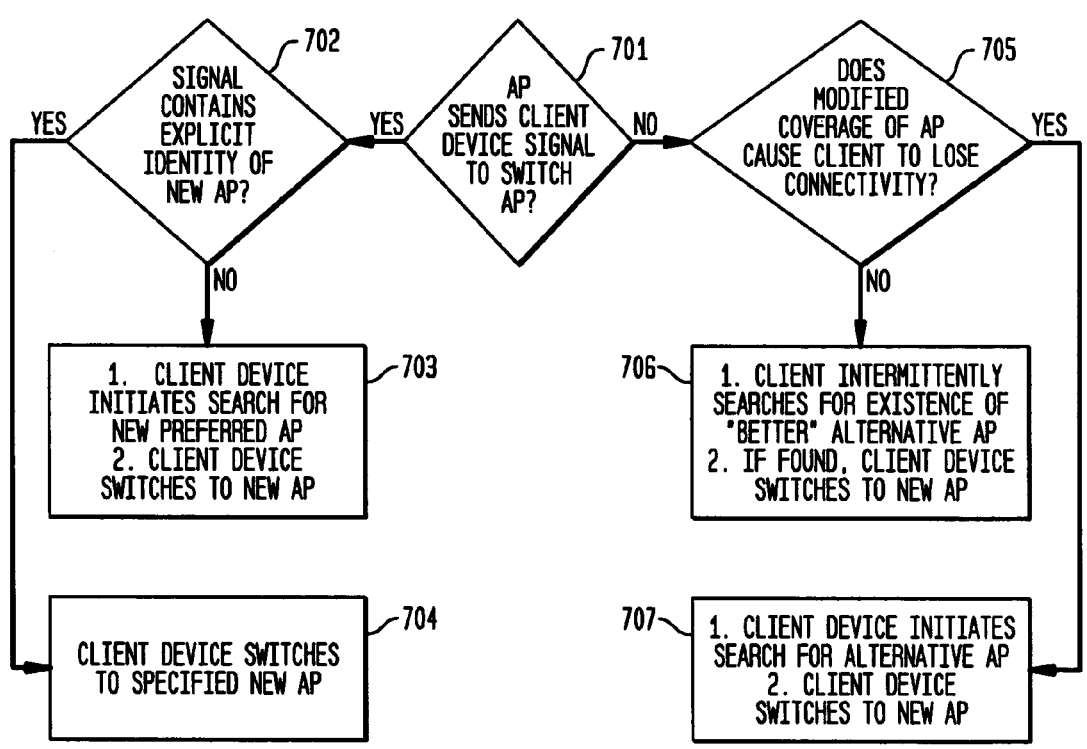
FIG. 7 is a flow chart depicting how the actual switching of a wireless client device to an alternative access point may be affected; and, FIG. 8 depicts the logical layout of the cellular network, including the Load Balancing Manager (LBM) software entity.

Advantageously, the method for load balancing according to another aspect of the invention does not directly involve the mechanism by which a wireless client device switches its access point. The client device is free to use a variety of alternative techniques to affect this switch. FIG. 7 illustrates a set of alternative approaches that may be utilized in conjunction with the power adjustment algorithm to enable a wireless client device to switch APs according to the invention.

In the embodiment depicted in FIG. 7, the current access point may issue an explicit instruction for reattachment to a wireless device. This reattachment instruction may either specify the identity of the new access point, or may merely instruct the client device to pick another alternative access point. In the latter case, the client device is then free to use any algorithm that uses measurements of link quality to determine its preferred access point from feasible alternatives. When the AP does not issue any explicit reattachment instruction, an alternative form of reattachment is triggered by the client device losing connectivity to its present AP. In this case, the client is again free to invoke any algorithm for choosing an alternative AP. It is important to note that many such algorithms are available, and the present invention does not mandate the use of any one particular algorithm over another. Clients are thus merely required to possess the capability to evaluate among alternative candidate AP's and select a preferred access point. This is a basic ability present in all practically useful client wireless devices.

The exact sequence of steps followed in the approach depicted in FIG. 7 depends on whether or not the access point that is shedding load explicitly instructs (701) the client device to switch to another access point. If the current AP sends an explicit switching instruction, then this instruction may explicitly include (702) the identity of the new AP. In that case, the client device merely has to perform the set of link and network-layer protocols to switch (704) its connection to the new specified AP. If the switching instruction does not explicitly specify a new AP (but merely instructs the client device to switch to some other AP), then the client device must first compute the set of feasible candidate APs, determine which of these is the best choice, and subsequently attach to the new chosen AP. The switching mechanism does not, however, explicitly rely on any instructions from the current AP to the wireless device; switching may be activated by other standard techniques as well. For example, if the reduced coverage area of the current AP causes (705) the wireless client device to lose connectivity to it, the client device will automatically hunt (707) for new alternative APs, pick a new candidate AP, and then attach to it. Switching may also take place if the reduced coverage area of the current AP does not cause an explicit loss of connectivity. Most wireless client devices implement some protocol that intermittently (706) evaluates the quality of the link to the current AP vis-a-vis the link quality to alternative APs. Due to the reduction in the current AP's power level, and the possible increase in the power level of neighboring APs, the client may discover, during this intermittent evaluation procedure, the existence of a better link to an alternative AP. In that case, the client may switch to the alternative AP by performing the necessary reattachment protocols. To avoid multiple switches generated by transients when neighboring APs adjust their power levels without exact synchronization, the client device may wait for a small period of time before determining the next preferred AP.

Accordingly, the present invention does not specify a new method for attaching to, or selecting, a preferred AP, but simply modifies the coverage areas of different APs so that load-balancing may be achieved by any such attachment or selection method.

Figure 8:
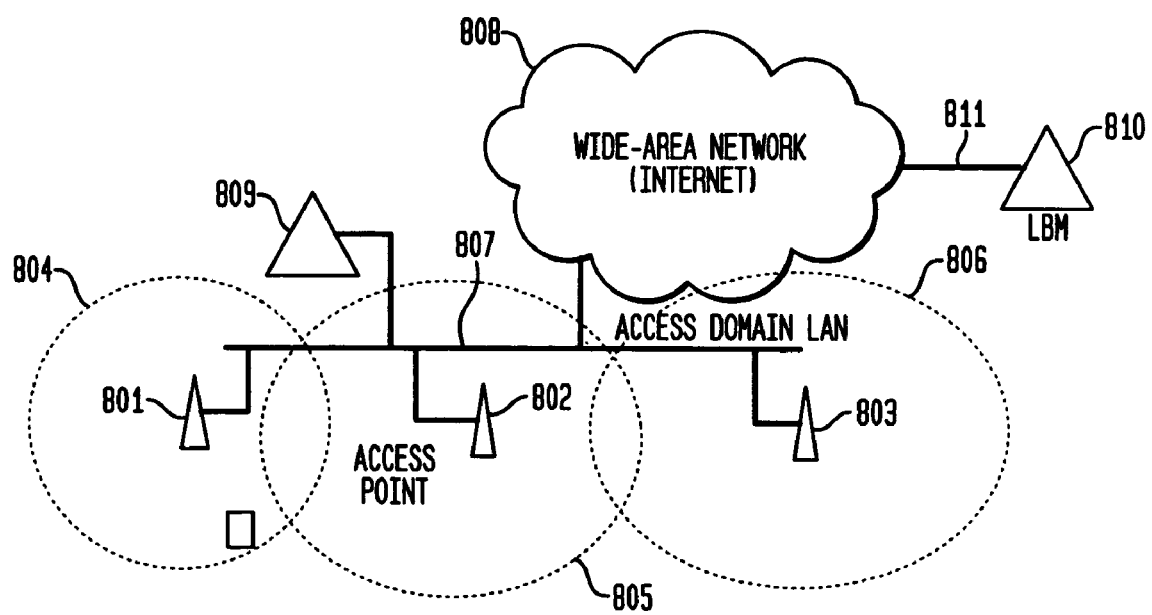

One of the features of this invention is that the centralized load balancing manager (LBM) does not need to be located in a specific place, but merely needs to have a network connection to the set of APs that it is controlling. FIG. 8 shows the logical layout of the cellular network, including the Load Balancing Manager (LBM). According to the invention, the LBM needs to be able to interface to the individual APs to determine their load levels, and to instruct them to adjust their transmission powers. Accordingly, the physical placement of the LBM inside the network is immaterial—it may be placed either in the cellular access network or somewhere else on the Internet, as long as there exists network connectivity between the LBM and the individual APs. More particularly, as shown in FIG. 8, there is depicted three access points, A (801), B (802) and C (803) with their respective coverage areas (804), (805) and (806), and, two (2) possible placement alternatives for the LBM. In a common embodiment of a practical access network, these APs will be connected to one another through a local-area networking (LAN) infrastructure (807). This LAN will in turn be connected to the backbone Internet infrastructure (808). In one embodiment of this invention, the LBM (809) may be placed in the local access network itself, and may thus be able to communicate with the APs using the access network itself. In an alternative embodiment, the LBM (810) may be located remotely from the site where the APs are deployed, and may need to access the APs over the Internet. To access the Internet, the remotely deployed LBM (810) will use its own local LAN infrastructure (811).

While the invention has been particularly shown and described with respect to illustrative and preformed embodiments thereof it will be understood by those skilled in the art that the foregoing and other changes in form and details may be made therein without departing from the spirit and scope of the invention which should be limited only by the scope of the appended claims.

The invention claimed is:

1. A method for relieving the traffic load on one or more wireless access points (APs) in a wireless cellular network, the method comprising the steps of:

detecting one of: a traffic overload or underload condition at one or more APs; an AP querying one or more neighboring APs to ascertain if power level should be changed at said neighboring APs;

modifying a transmission power level associated with said one or more neighboring APs according to a detected condition, thereby modifying the size of the associated coverage area of each AP; and, initiating switching of one or more of the current wireless devices from their current attachment to a first of said one or more APs to an alternative neighboring AP, thereby modifying the traffic load at said first and alternative APs, wherein each AP operates autonomously to perform AP power control in a distributed fashion without relying on any actual measurement of transmission characteristics of individual devices or APs.

2. The method as recited in claim 1, wherein said wireless cellular network is packet-based, said detecting step comprising monitoring one or more of: traffic related metrics and various performance metrics associated with packets transmitted via said AP, and generating overload condition signals at said AP when said overload or underloaded condition at an AP is detected.

3. The method as recited in claim 2, wherein said modifying step b) comprises one of: increasing or decreasing the transmission power level associated with one or more APs, said transmission power being decreased at an overloaded AP to a lower power level, and transmission power being correspondingly increased at a neighboring AP to ensure appropriate overlap of coverage areas.

4. The method as recited in claim 3, wherein said detecting further comprises: tracking the number of attached users at each access point and, generating an overload condition signal if these values exceed a threshold value.

5. The method as recited in claim 3, wherein said performance metric includes one or more of: a packet delay, a packet loss rate, and AP processor utilization, said detecting further comprising: comparing one or more of said packet delay, packet loss rate and AP processor utilization against a respective threshold value and generating an overload condition signal at said AP if these values exceed a threshold value.

6. The method as recited in claim 3, wherein said traffic related metric includes total traffic rate or the number of users at one or more access points, said detecting further comprising: comparing said total traffic rate or the number of users at one or more access points against a threshold value and generating an overload indication signal at said AP if the total traffic rate or the number of users at one or more access points exceed a threshold value.

7. The method as recited in claim 3, further comprising providing a centralized load balancing means for receiving overload condition signals generated by an AP, and controlling modification of said power levels at said AP and alternative APs in response thereto.

8. The method as recited in claim 1, wherein said initiating switching step c) comprises one of: explicitly instructing a client device to switch to another identified access point, or enabling a client device to initiate a search for a new AP and then switch to that new AP.

9. A system for relieving the traffic load on one or more wireless access points (APs) of a wireless cellular network comprising:
  means for detecting one of: a traffic overload or underload condition at one or more APs and generating one or more overload signals or underload signals at said AP upon detection of said overload or underload condition, respectively;
  means for communicating said overload and underload signals to one or more neighboring APs;
  means for modifying a transmission power level associated with said one or more APs according to a detected condition, each AP operating autonomously to perform AP power control in a distributed fashion, thereby modifying the size of the associated coverage area of each AP; and,
  means for switching of one or more of the current wireless devices from their current attachment to a first of said one or more APs to an alternative AP, thereby modifying the traffic load at said first and alternative APs without relying on any actual measurement of transmission characteristics of individual devices or APs.

10. The system as recited in claim 9, wherein said wireless cellular network is packet-based, said detecting means comprising:
  means for monitoring one or more of: traffic related metrics and various performance metrics associated with packets transmitted via said AP;
  means for comparing said traffic and packet performance related metric values with threshold values to determine said overload or underloaded condition; and,
  means for generating overload condition signals at said AP when an overload and underload condition at an AP is detected.

11. The system as recited in claim 10, wherein said means for modifying a transmission power level performs one of: increasing or decreasing the
  transmission power level, said transmission power being decreased at an overloaded AP to a lower power level, and transmission power being correspondingly increased at an alternative AP to ensure appropriate overlap of coverage areas.

12. The system as recited in claim 11, wherein said transmission power at an individual AP is modified according to the explicit location of wireless client devices to either determine the appropriate level of power increase necessary to allow certain client devices that are currently attached to alternative APs to switch to a first AP, or, determine the appropriate level of power decrease needed to ensure that certain client devices currently attached to the first AP are switched to alternative APs.

13. The system as recited in claim 12, wherein an AP generates signals explicitly instructing a client device to switch to another identified access point, or signals enabling a client device to initiate a search for a new AP to be switched to.

14. A method for modifying the transmission power levels at individual wireless access points (APs) of a wireless cellular network, the method comprising the steps of:
  a) detecting one of: a traffic overload or underload condition at one or more APs and generating one or more overload and underload signals at said AP upon detection of said overload or underload condition;
  b) communicating said overload and underload signals to one or more neighboring APs, each AP equipped to modify its associated transmission power level in coordination with said one or more neighboring APs according to a detected condition, each AP operating autonomously to perform AP power control in a distributed fashion without relying on any actual measurement of transmission characteristics of individual devices or APs thereby modifying the size of the associated coverage area of each AP; and,
  c) initiating switching of one or more of the current wireless devices from their current attachment to a first of said one or more APs to an alternative neighboring AP,
  whereby the traffic load at said first and alternative APs becomes modified.

15. The method for modifying the transmission power levels as recited in claim 14, wherein AP transmission power levels at an individual AP is modified according to the explicit location of wireless client devices to either determine the appropriate level of power increase necessary to allow certain client devices that are currently attached to alternative APs to switch to a first AP, or, determine the appropriate level of power decrease needed to ensure that certain client devices currently attached to the first AP are switched to alternative APs.

16. The method for modifying the transmission power levels as recited in claim 15, where said modifying of transmission power at APs, further comprises one or more of actions comprising: decreasing the transmission power of an overloaded AP, and increasing the transmission power of an underloaded AP.

17. The method for modifying the transmission power levels as recited in claim 16, wherein said wireless cellular network is packet-based, said method further comprising the steps of:
  monitoring, at each AP, one or more of: traffic related metrics and various performance metrics associated with packets transmitted via said AP;
  comparing traffic and packet performance related metric values with threshold values to determine said overload or underloaded condition; and,
  generating overload condition signals at said AP when an overload and underload condition at an AP is detected.

18. The method for modifying the transmission power levels as recited in claim 16, wherein said transmission power at an individual AP is modified according to the explicit location of wireless client devices to either determine the appropriate level of power increase necessary to allow certain client devices that are currently attached to alternative APs to switch to a first AP, or, determine the appropriate level of power decrease needed to ensure that certain client devices currently attached to the first AP are switched to alternative APs.

19. The method for modifying the transmission power levels as recited in claim 16, wherein the step of increasing AP transmission power further comprises: increasing the transmission power of an AP beyond a level needed to support communication with its current set of attached devices.

20. The method for modifying the transmission power levels as recited in claim 16, wherein the increasing or decreasing of AP transmission power further comprises: increasing or decreasing the transmission power of one or more wireless client devices that are attached to, or is enabled to attach to, an AP.

21. The method for modifying the transmission power levels as recited in claim 16, wherein the modifying of AP transmission powers further comprises: enabling coverage area of one or more APs become entirely included within a larger coverage area of another access point.

22. The method for modifying the transmission power levels as recited in claim 16, wherein the modifying of AP transmission powers further comprises one of: adjusting the power levels of an overloaded AP in a manner independent of the load levels, or in a manner that is based on the actual or estimated load level.

23. The method for modifying the transmission power levels as recited in claim 16, wherein said transmission power at an individual AP with one or more attached wireless client devices is reduced by generating signals for receipt by said client devices instructing said client devices to bind to another alternative access point.

24. The method for modifying the transmission power levels as recited in claim 23, wherein the signals received by said attached wireless devices comprise: signals instructing the wireless client device to explicitly switch to a particular alternative access point, or instructing it to switch to any alternative feasible access point, said instructed wireless device losing connectivity to the access point to which the wireless device is current attached, and subsequently binding to an alternative access point.

* * * * *